United States Patent [19]
DeJong

[11] 3,967,462
[45] July 6, 1976

[54] METHOD AND APPARATUS FOR JOINING A SUBSEA PIPELINE TO AN OFFSHORE PLATFORM RISER

[75] Inventor: Jan DeJong, Delta, Canada

[73] Assignee: Lockheed Petroleum Services Ltd., New Westminster, Canada

[22] Filed: Mar. 10, 1975

[21] Appl. No.: 557,121

[52] U.S. Cl. .................................. 61/72.3; 166/.5; 285/27
[51] Int. Cl.² ........................................ F16L 35/00
[58] Field of Search ................... 61/72.3, 72.1, 69; 166/.5, .6; 285/27

[56] References Cited
UNITED STATES PATENTS

| | | | |
|---|---|---|---|
| 2,692,102 | 10/1954 | Cobham et al. | 285/27 X |
| 3,482,410 | 12/1969 | Roesky et al. | 61/72.3 |
| 3,701,261 | 10/1972 | Nolan, Jr. | 61/72.3 |
| 3,795,115 | 3/1974 | Bergquist | 61/72.3 |
| 3,835,655 | 9/1974 | Oliver | 61/72.3 |
| 3,855,806 | 12/1974 | LeTherisien | 166/.5 X |

Primary Examiner—Jacob Shapiro
Attorney, Agent, or Firm—Billy G. Corber; Keiichiro Imai

[57] ABSTRACT

Apparatus includes an offshore platform riser subtended by a joint chamber having port means for receiving a subsea pipeline and access means for a submersible capsule. The riser and chamber are attached to the platform in such manner as to provide for thermal expansion and to permit detachment when an abnormal loading is encountered. Platform winch means attached to cable means passing through the riser and chamber are used to pull an end of the pipeline into the chamber. Personnel utilizing the capsule then enter the chamber for completing the joining of the pipeline and riser. The joining and subsequent inspection operations are conducted at substantially atmospheric conditions in the chamber.

6 Claims, 5 Drawing Figures

METHOD AND APPARATUS FOR JOINING A SUBSEA PIPELINE TO AN OFFSHORE PLATFORM RISER

BACKGROUND OF THE INVENTION

1. Field of the Invention

This invention relates to a method and apparatus for joining a subsea pipeline to a riser attached to an offshore petroleum recovery platform. The apparatus is particularly useful for joining large diameter pipes at seabed depths where the effectiveness of divers is severely limited.

2. Description of the Prior Art

U.S. Pat. No. 3,599,436 describes a method and apparatus for joining a subsea pipeline to a riser wherein a submersible work chamber is placed over the adjacent ends of the submerged pipeline and the riser. Sea water is evacuated from the chamber under high pressure and the pressure is maintained to permit divers to weld the ends together. This method and apparatus is obviously limited to uses at depths at which divers can work with reasonable efficiency. The limiting depths are generally acknowledged to be about 250 to 300 feet.

Another method and apparatus for joining a subsea pipeline to a riser is exemplified by that shown in U.S. Pat. No. 3,707,077. Here a portion of the pipeline initially laid on the seabed is raised to the surface and joined to a riser bend section. The pipeline is then lowered and simultaneously additional sections of the riser are added to the bend section as the completed riser is installed on the platform. This technique is also limited to relatively calm shallow water, approximating 150 feet in depth, by the pipe handling capability of surface derrick and davit equipment.

SUMMARY OF THE INVENTION

It is an object of the present invention to provide an apparatus and method for joining a pipeline to a platform riser which is useful at depths beyond which divers cannot operate efficiently.

It is also an object of the present invention to provide apparatus wherein the joining operation is conducted under working conditions closely approximating those on the surface so that special tools, techniques and equipment for pipeline welding need not be devised.

A further object of the present invention is to provide apparatus which is adapted to cope with special operating conditions, such as thermal expansion and abnormal structural loading.

A still further object of the present invention is to provide apparatus and method which are more economical than previously proposed apparatus and methods.

the apparatus of the present invention includes a riser pre-installed on the platform before the platform is located on the seabed. The J-shaped end of the riser is subtended by a joint chamber wherein actual joining of the riser and pipeline is made. The riser and chamber are installed on the platform so as to withstand sea movements, pipeline pull-in forces, thermal expansion and contraction, and, when required, to break away or become detached from the platform when an abnormal loading is encountered.

The joint chamber is provided with port means to receive the pipeline, the latter being pulled to the chamber by cable means passing through the riser to winch means on the platform deck. The port means may be provided with a flexible receptacle for the pipeline which facilitates entry of the pipeline into the port means.

The joint chamber is further provided with access or entry means which are adapted for connection with a submersible personnel capsule. After the pipeline is joined with the chamber and any water present is pumped out, personnel utilizing the capsule descend to the chamber and enter it to complete the joining with a linking or spool section of pipeline. The joining and subsequent inspection operations are conducted at substantially atmospheric conditions.

Other features and advantages of the present invention will become more apparent from the following detailed description of typical forms and applications of the invention taken in conjunction with the accompanying drawings.

BRIEF DESCRIPTION OF THE DRAWINGS

FIG. 4 is an enlarged, elevation view of the chamber port means with a plug installed prior to pipeline pull-in.

DESCRIPTION OF THE PREFERRED EMBODIMENT

Figure 1:
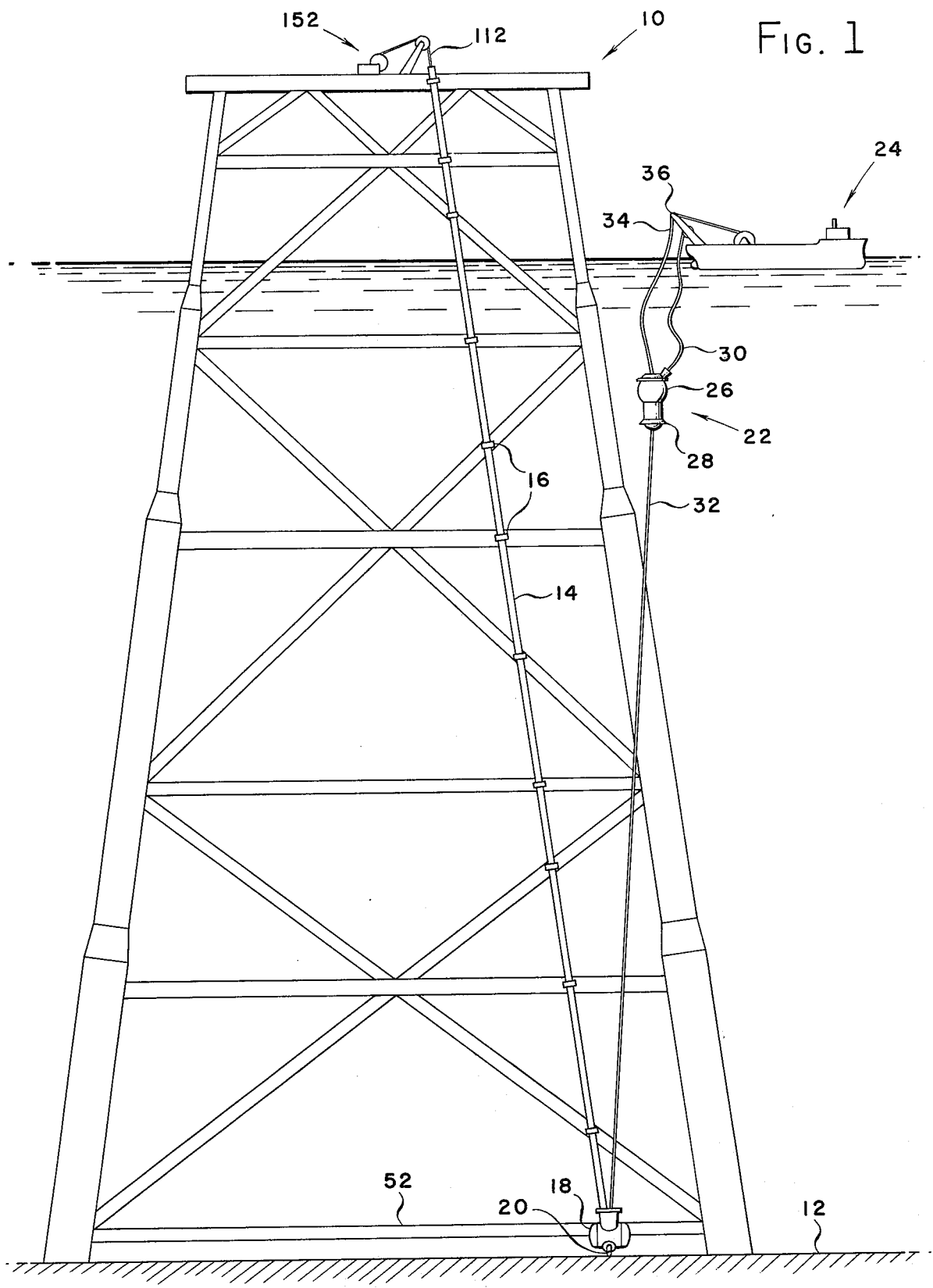
FIG. 1 is a schematic elevation view showing the over-all arrangement of the present apparatus including an offshore platform, a riser, a joint chamber, a pipeline, and a capsule descending to the chamber.

FIG. 1 shows a typical offshore platform 10 located on the seabed 12. A riser 14 is attached to the platform with clamps 16. Subtending the riser is a joint chamber 18. Typically, the riser and joint chamber are assembled and attached to the platform on land. FIG. 1 also shows a pipeline 20 attached to the joint chamber and a capsule 22 descending to the chamber from a surface vessel 24 preparatory to completing the joining of the pipeline and riser in the chamber. Capsule 22 is a bulbous pressure vessel with a service and crew portion 26 and an open skirt portion 28. Vessel 24 supplies the capsule with air, hydraulic fluid, electrical and communication lines through an umbilical cord 30. Descent of the capsule to the chamber is made by winching in cable 32 fixed to the chamber. After completion of the joint, the capsule is returned to the surface vessel by means of cable 34 attached to derrick and winch means 36.

Figure 2:
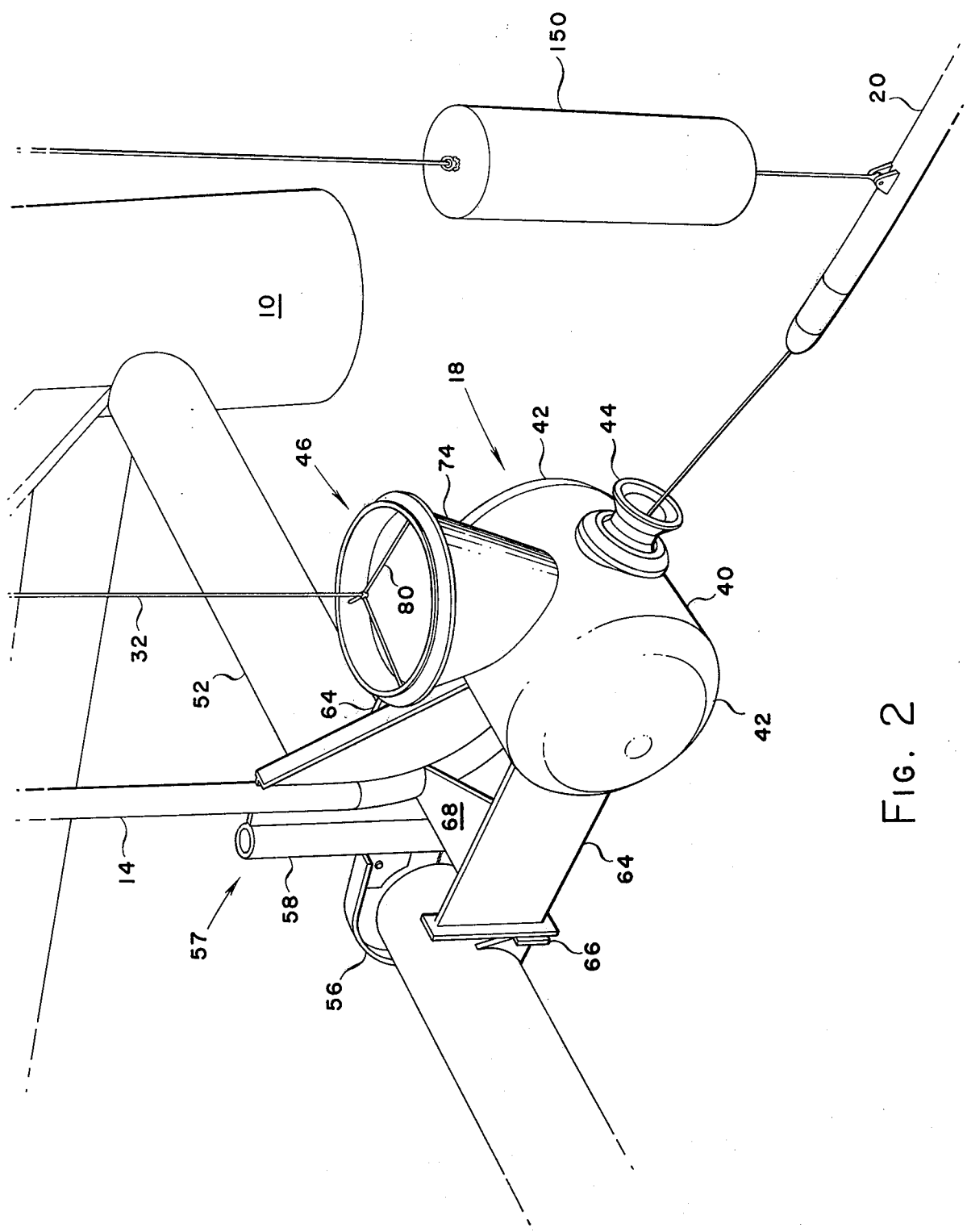
FIG. 2 is a perspective view showing the riser and chamber installed on a horizontal member of the platform and a pipeline being pulled to the chamber.
Figure 3:
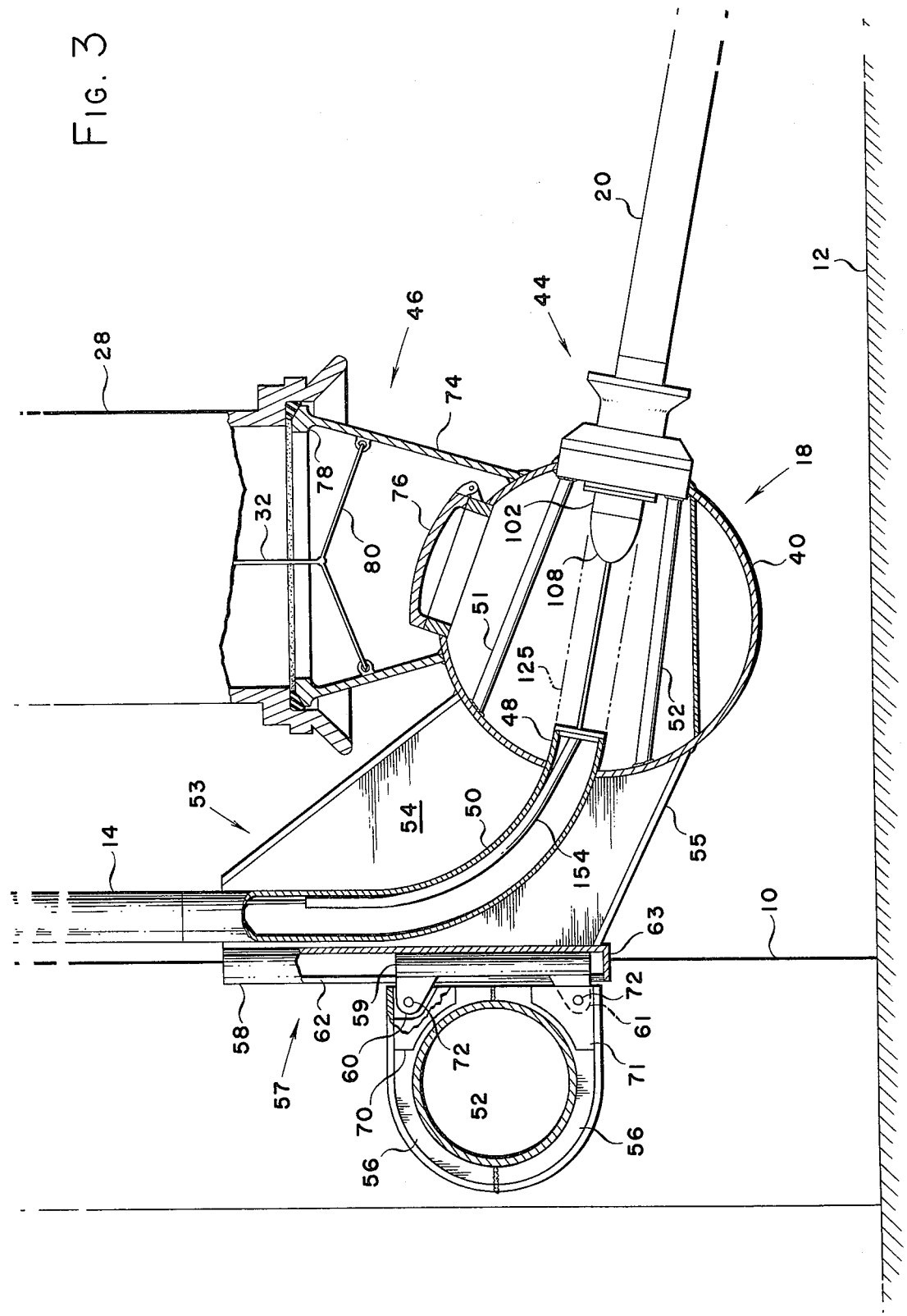
FIG. 3 is a side elevation view showing the pipeline and capsule joined to the chamber.

As shown in FIGS. 2 and 3, joint chamber 18 has a cylindrical pressure hull 40 capped by semi-ellipsoidal, or hemispherical, ends 42. Mounted on the hull are port means 44 adapted to receive a pipeline and access or entry means 46 adapted for connection to capsule 22. Opposite port means 44 and penetrating the hull is the end portion 48 of the J-shaped bend section 50 of riser 14. End portion 48 is welded in place. Support braces 51 may also be provided in hull 40 to help withstand any abnormal loads during pipeline pull-in.

Chamber 18 and riser 14 are attached or mounted on a horizontal platform member 52 by means of a saddle member 53 which includes riser stiffening plates 54, 55 welded to bend section 50 and to the hull and a segmented collar member 56 fitted around and welded to platform member 52. Attached to plate 54 is a slide device 57 comprising an outer sleeve 58 and a concentric inner pipe 59 over which sleeve 58 slides. Pipe 59 has upper and lower attaching lugs 60, 61 for connection to collar member 56. Sleeve 58 has a longitudinal slot 62 providing clearance for lugs 60, 61 during sliding movement of sleeve 58. An end stop 63 on sleeve 58 restricts upward sliding movement.

Slide device 57 is especially useful when large diameter pipelines are being joined. It accommodates thermal expansion of the riser when hot fluids are passed through the riser. It also provides dimensional tolerance in the position of the chamber with respect to the seabed at various operational stages, including installation and pipeline alignment. Slide device 57 need not be used for small diameter pipes, such as flowlines, because of the greater flexibility of such pipes.

Chamber 18 is further braced on both sides of the riser with side plates 64 which butt in sliding relationship against contact members 66 on platform member 52. The side plates are in turn braced against buckling with gusset plates 68 placed between them and the riser.

Lugs 60, 61 may be inserted between dual attaching plates 70, 71 welded on opposite sides of collar 56 and may be fastened with shear pins 72. These pins may be designed to yield at an abnormal pull-away loading, such as that caused by an accidental snagging of an anchor on the pipeline. The consequent detachment of the riser and chamber avoids or minimizes damage of the platform structure.

Access means 46 comprises a truncated, conical chamber 74 and hatch or door means 76 providing entry into hull 40. Chamber 74 has a flanged end 78 adapted to mate with the skirt portion 28 of the capsule. This juncture of skirt portion 28 and chamber 74 forms a connecting water-tight enclosure. A bridle 80 in chamber 74 holds cable 32 used to bring the capsule down to the joint chamber.

Figure 4:
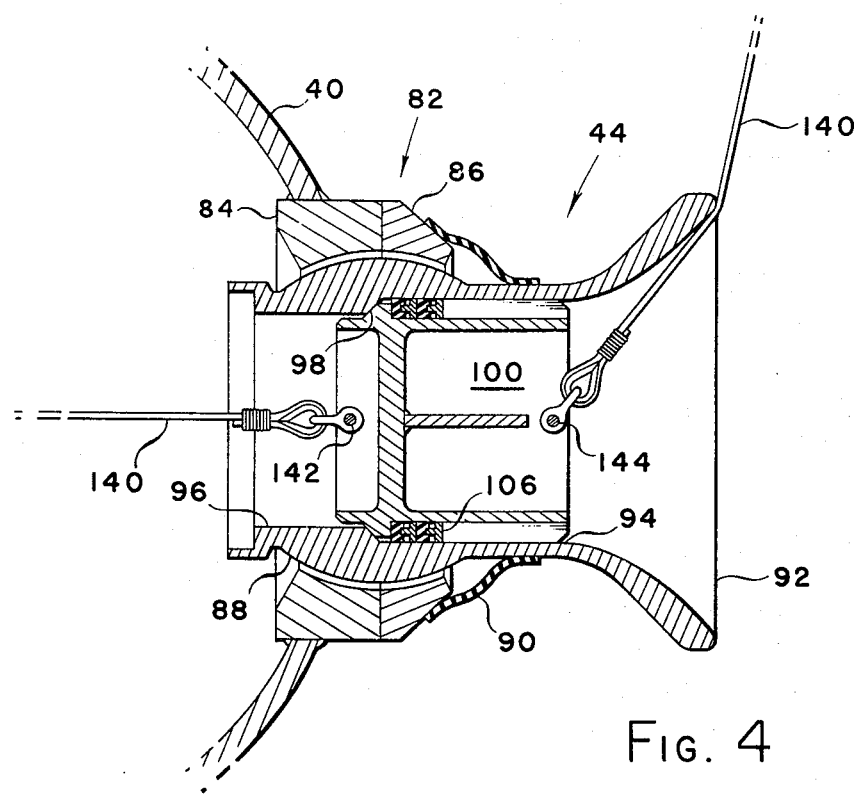
Figure 5:
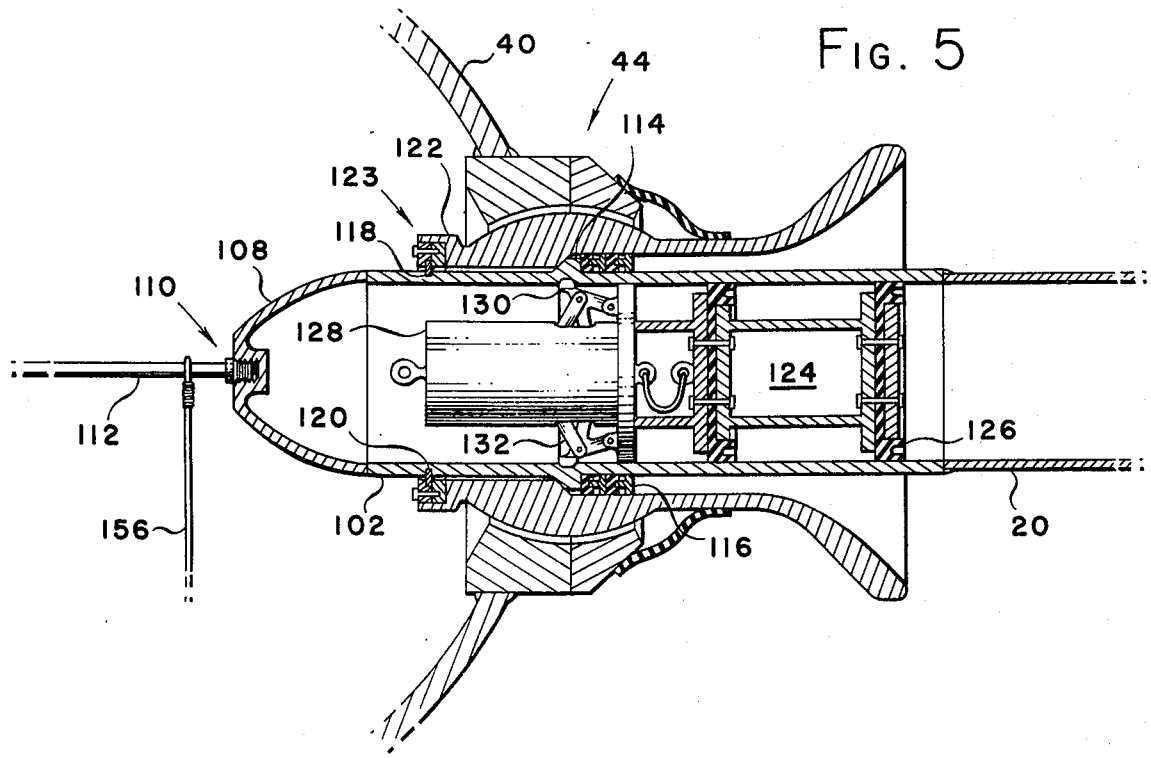
FIG. 5 is also an enlarged, elevation view of the chamber port means with a pipeline end portion fitted in the port means.

As shown more clearly in FIGS. 4 and 5, port means 44 includes an annular socket member 82 consisting of an inner ring 84 welded to the hull wall and a segmented outer ring 86. Port means 44 also includes a flared, ball member 88, pivotable within socket member 82, and a rubber sealing gasket 90. Ball member 88 has a flared opening 92, a constant diameter opening 94, and a reduced diameter bore 96. The conjunction of opening 94 and bore 96 forms a shoulder or stop 98 for a cylindrical port plug 100 or for pipeline termination 102. Plug 100 and accompanying annular sealing element 106 serve to keep seawater, sand, and marine life out of the port prior to installation of the pipeline.

The ball and socket arrangement shown in FIGS. 3 and 4, which can be swiveled about 10° from the center line, is particularly useful for aligning large diameter pipelines, ranging from 12 to 48 inches in diameter, which have limited flexibility. Elastomeric flexible joints may also be used. For pipelines of smaller diameter or a bundle of small flowlines, a flared cylindrical opening integral with the hull would be adequate. All of these types of port means are contemplated as falling within the scope of the present invention.

As shown in FIG. 5, pipeline termination 102 is welded to pipeline 20 and is capped by a bull nose 108 having detent means 110 for a pull-in cable 112. Bull nose 108 may be welded to or threaded onto termination 102. The latter also has a ring or collar 114 adapted to impinge on shoulder 98 to stop further movement of the pipeline in the ball member. Annular sealing element 116 provides sealing action after the pipeline is fitted into the ball member.

To secure the pipeline to the chamber before removal of cable 112, a snap ring 118 is provided, which fits into an annular groove 120 in termination 102 and abuts against flange 122 on ball member 88. Ring 118 is held in place by an annular retainer member 123 appropriately fastened to flange 122.

To prevent accidental ingress of seawater into the chamber, termination 102 is provided with a plug member 124 with cup seals 126. Plug member 124 is held in place with a release device 128 detained in annular groove 130 in termination 102. Device 128 is provided with appropriate linkage 132 which will release it from its detained position when a pulling force is applied to it. Plug member 124 may be suitably tied to device 128 so that it can be removed from the termination 102 simultaneously with release device 128.

During installation and mounting of the riser and joint chamber to the platform structure, a pilot line 140 attached to pull-in cable 112 is passed through riser 14 and connected to fitting 142 on port plug 100. A continuation portion of pilot line 140 is connected to fitting 144 on plug 100 and its free end is retained on the surface. One end of capsule pull-down cable 32 is also retained at the water surface for later connection to the capsule.

For purposes of illustration, the operation of the present apparatus will be described in terms of a lay-away procedure where the pipeline layer is started at a distance from the platform and is continued while moving away from the platform. It will be apparent to those skilled in the art that the present apparatus can also be used for a lay-to, or landing, procedure where most of the pipeline has been previously laid on the seabed, but the terminus still needs to be connected to the riser.

Chamber 18 is initially flooded through riser 14 to equalize pressure on port plug 100 so that it can be pulled out of ball member 88 by means of pilot line 140 and removed at the surface. The drawing of pilot line 140 also pulls attached cable 112 through the riser, chamber, and port means. The cable is eventually retrieved on a lay barge (not shown) at a distance from the platform.

On the lay barge, pipeline termination 102 and bull nose 108 are connected to the first segment of pipeline 20 and cable 112 is attached to bull nose 108. For large diameter pipes, a hard buoy 150 with a surface marker buoy (not shown) may also be attached to the first segment of pipeline 20 to assist in lifting and aligning the pipeline end with the chamber port means.

After sufficient pipeline has been laid to touch bottom over a specified length, further laying is stopped but tension is maintained on the pipeline. Platform winch means 152 attached to cable 112 now starts pulling the pipeline toward the chamber port. To reduce friction loss or damage of the riser, a protective sleeve 154 may be provided for cable 112 in the bend section 50 of the riser. The downward cant of the port means, the ball and socket arrangement, the flared opening, and the hard buoy on the pipeline termination all contribute to a smooth entry of the pipeline into the chamber. Pulling of the pipeline is stopped when termination collar 114 bottoms on shoulder 98 on ball member 88. During the final stage of the pull-in, a small submersible pump (not shown) is lowered into the riser to pump out sea water from the riser. Sealing action of seals 116 is enhanced by the difference in hydrostatic pressure created by evacuation of the sea water.

Capsule 22 carrying personnel and equipment from surface vessel 24 is then winched down to the joint chamber where skirt portion 28 mates in sealing relationship with the chamber access means 46, as shown in FIG. 3. Sea water is evacuated from the skirt portion 28, chamber 74, and hull 40 by pumps (not shown) on the capsule. Hull 40 and the connecting passages to the capsule crew portion are maintained at substantially atmospheric pressure conditions for the ensuing joining operation.

Personnel descend into the hull via hatch means 76 and secure the pipeline to the chamber by use of snap ring 118 and retainer member 123. Tension on pull-in cable 112 is slackened, and the cable is removed from the bull nose. A light cable 156 is attached to cable 112 before cable 112, sleeve 154 and cable 156 are pulled up the riser by platform winch means for retrieval at the surface. The free end of cable 156 is retained in the hull for later use in releasing plug member 124.

Bull nose 108 is removed from the termination to expose plug member 124. The free end of cable 156 is then passed through a pipeline connecting link or spool 125 and attached to release device 128. The link is then welded in place in the gap between the riser end 48 and termination 102. Radiographic and other inspection of the weld is made to assure joint integrity. The link and attached parts are coated for corrosion protection. Cable 156 is then pulled at the surface to release plug 124 from the pipeline termination for retrieval at the surface.

After completion of the joining operation, personnel return to the capsule with the welding and inspection equipment, and the capsule is hauled up to the surface with cable 34.

It will be noted that the final joining of the pipeline and the riser is independent of the laying operation and can be conducted at any time; for example, when the weather is favorable. For a lay-away procedure, the lay barge can continue with the pipe laying immediately after the pull-in has been completed. For a lay-to, or landing, procedure, the lay barge can be released for other work. There is no standby requirement in either case while the pipeline is being connected to the riser. Thus, the savings in personnel and equipment costs are substantial.

Other variations and modifications of the present invention will be obvious to those skilled in the art and its intended to cover in the appended claims all such modifications and equivalents as fall within the true spirit and scope of the invention.

I claim:

1. Apparatus for joining a subsea pipeline to an offshore platform riser, said apparatus comprising:
   a riser having a seabed end;
   a joint chamber enclosing a portion of the seabed end;
   port means in said chamber for receiving a pipeline end for connection to said seabed end;
   means for pulling an end of the pipeline into the chamber;
   means for supporting said riser end and said chamber on the platform, said means including means providing for relative movement of the riser end and chamber with respect to the platform to accommodate service conditions;
   and access means in said chamber.

2. Apparatus according to claim 1, wherein the support means includes means providing for generally vertical movement of the riser end and chamber due to thermal expansion of the riser.

3. Apparatus according to claim 1, wherein the support means includes means providing for generally vertical movement of the riser end and chamber due to misalignment of the pipeline end and the chamber port means.

4. Apparatus according to claim 1, wherein the support means includes means providing for breakaway movement of the riser end and chamber at a predetermined loading of the pipeline.

5. Apparatus for joining a subsea pipeline to an offshore platform riser, said apparatus comprising:
   a riser having a seabed end;
   a joint chamber enclosing a portion of the seabed end;
   port means in said chamber for receiving a pipeline end for connection to said seabed end;
   means for pulling an end of the pipeline into the chamber;
   a saddle member for supporting said riser end and chamber on the platform, said saddle member comprising stiffening plates on the riser end, a collar member encircling an adjacent platform member, and a slide device between the plates and collar member for generally vertical movement of the riser and chamber with respect to the platform;
   and access means in said chamber.

6. Apparatus for joining a subsea pipeline to an offshore platform riser, said apparatus comprising:
   a riser having a seabed end;
   a joint chamber enclosing a portion of the seabed end;
   port means in said chamber for receiving a pipeline end for connection to said seabed end;
   means for pulling an end of the pipeline into the chamber;
   a saddle member for supporting said riser end and chamber on the platorm, said saddle member comprising stiffening plates on the riser end, a collar member encircling an adjacent platform member, and shear pin means for releasing said riser end and chamber from the platform member at a predetermined loading;
   and access means in said chamber.

* * * * *